United States Patent [19]

McKeown et al.

[11] 3,725,853

[45] Apr. 3, 1973

[54] ELECTRICAL CONTACT

[75] Inventors: James E. McKeown; Donald E. Michel, both of Sidney, N.Y.

[73] Assignee: The Bendix Corporation, Smithfield, Mich.

[22] Filed: Mar. 22, 1971

[21] Appl. No.: 126,803

[52] U.S. Cl. ................339/252 R, 339/48, 339/75 R

[51] Int. Cl. ..........................H01r 11/22, H01r 25/00

[58] Field of Search .......339/75 R, 75 M, 75 MP, 91, 339/258 T, 47, 49, 253, 260, 261, 200 P, 48, 17 L, 64 R, 64 M, 65 R, 66 M

[56] References Cited

UNITED STATES PATENTS 3,620,490 11/1971 Roberts ...............................85/79 X
3,441,898 4/1969 Nodfelt ................................339/48
2,702,895 2/1955 Pavlinetz.......................339/213 T X
3,140,907 7/1964 Davies ...............................339/17 L
3,538,486 11/1970 Shlesinger, Jr. ..................339/174 X

FOREIGN PATENTS OR APPLICATIONS 1,528,076 4/1968 France ............................339/17 LC

*Primary Examiner*—Marvin A. Champion
*Assistant Examiner*—Terrell P. Lewis
*Attorney*—Raymond J. Eifler and Plante, Hartz, Smith & Thompson

[57] ABSTRACT

An electrical contact which is comprised of a pair of elongated male electrical conductor members having angled end portions in face-to-face relationship so that when the male members, entering opposite sides of an electrical conductor conduit are forced together, the action of the angled surfaces against one another force the male members into pressure contact with the inner wall of the conduit thereby placing the conduit in electrical circuit relationship with the male members.

2 Claims, 7 Drawing Figures

JAMES E. McKEOWN
DONALD E. MICHEL
*INVENTORS*

BY R. J. Eifler
ATTORNEY

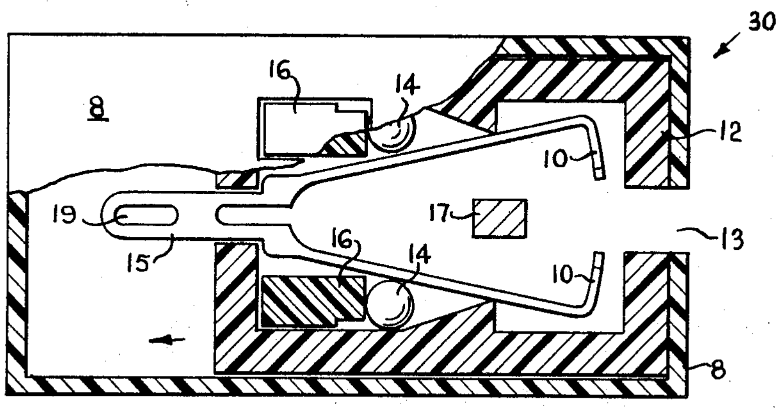
FIGURE 3
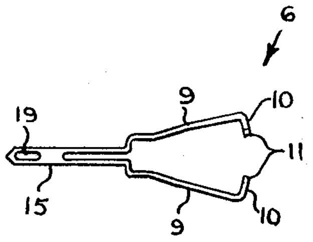
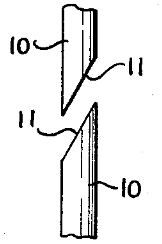
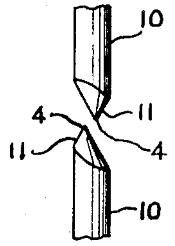
FIGURE 5 FIGURE 6 FIGURE 7
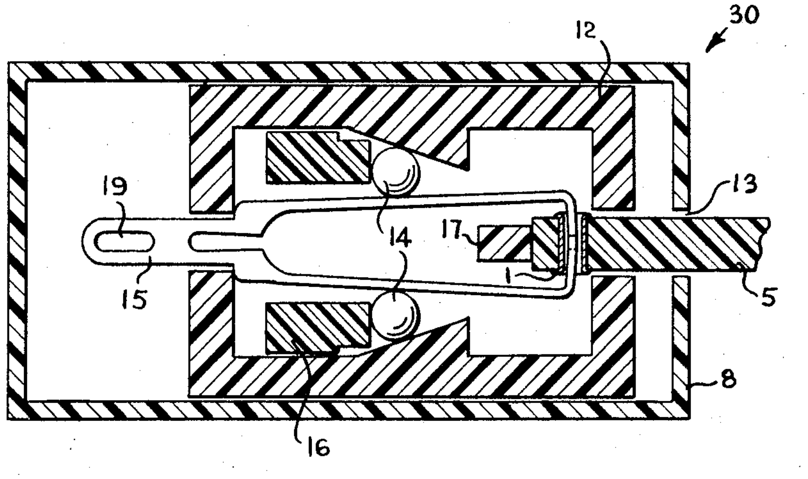
FIGURE 4
JAMES E. McKEOWN
DONALD E. MICHEL
*INVENTORS*
BY R. J. Eifler
ATTORNEY

ELECTRICAL CONTACT

CROSS REFERENCE TO RELATED APPLICATION

This application is related to application (Ser. No. 126,801 filed Mar. 22, 1971) entitled "Printed Circuit Board Connector," mailed to the Patent Office concurrently with this application.

BACKGROUND OF THE INVENTION

This invention relates to electrical connectors and is more particularly related to a new type of electrical contact.

Presently, printed circuit boards are connected to other electrical circuits by mating plated electrical conductors on the end portion of a printed circuit card with a card edge connector. Some of the disadvantages associated with present card edge connectors are: plating the conductors on the printed circuit board is generally expensive (gold plating in wide use); poor electrical contact begins to occur after prolonged use; and during shock and vibration testing printed circuit boards come out of the card edge connectors. Further, female contacts such as metal conduits tend to build up an oxide on the contact surface over the life of a connector. Attempts to keep the contact surface of the female member free of oxides by action of the male member against that surface has resulted in excessive wear of the male and female contacts which results in poor electrical conductivity between the contacts. This is because the inner diameter of the female contact and the outer diameter of the male contact wear down until the contacts no longer mate together in pressurized contact.

SUMMARY OF THE INVENTION

To eliminate the disadvantages associated with current printed circuit board contacts, a new type of contact has been developed that provides a low resistance drop between the circuit board and the connector over the life of the connector regardless of the wear affecting the contacting surfaces.

The invention is a male electrical contact characterized by a pair of axially aligned elongated male contact members that by the configuration of their mating surfaces are forced out of alignment upon contact with each other. The invention is further characterized by the fact that male contacts are used in pairs and are an integral generally Y-shaped metal structure having a base portion and a pair of resilient arms each of which include an elongated end portion axially aligned with and projecting towards each other, the end portions terminating in angled or tapered surface portions that oppose each other in a complementary or face-to-face relationship so that on contact the elongated end portions are moved out of axial alignment. In one embodiment of the invention, the electrical contact comprises: A first elongated member having an end portion which includes an angled surface; a second elongated member having an end portion which includes an angled surface; and means for axially aligning the first elongated member with the second elongated member so that the angled surfaces are confronting each other, said means providing for the axial movement of at least one of said elongated members towards the other so that said angled surfaces contact each other and force said elongated members out of alignment. This arrangement prevents the wear of either contact from affecting the pressure contact between the mating surfaces of a connector.

Accordingly, it is an object of this invention to provide a new type of electrical contact.

It is another object of this invention to provide a male contactor plug that is capable of changing its effective cross-sectional area to compensate for the change in the cross-sectional area of the female receptacle due to wear.

It is a further object of this invention to provide a new type of male electrical contact.

The above and other objects and features of the invention will become apparent from the following detailed description taken in conjunction with the accompanying drawings and claims which form a part of this specification.

BRIEF DESCRIPTION OF THE DRAWINGS

FIG. 3 is a partial cross-sectional view of a connector that houses the male contacts.

FIG. 4 illustrates a cross-sectional view of the connector of FIG. 3 in mated relationship with a circuit board.

FIG. 5 illustrates an electrical contact that embodies the principles of this invention.

FIG. 6 is a side view of FIG. 5 illustrating the complementary relationship of the angled surfaces of the opposing end portions.

FIG. 7 is another preferred embodiment illustrating conical or tapered end portions of the elongated members and the complementary relationships therebetween.

DETAILED DESCRIPTION OF THE DRAWINGS

Figure 1:
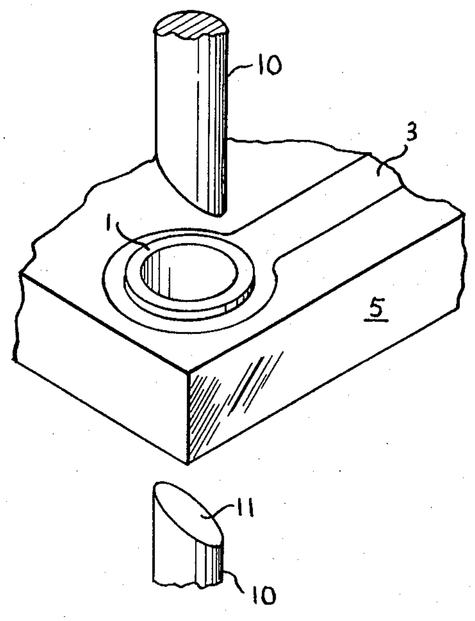
FIG. 1 is a partial diagram of the male and female contacts of a circuit board connector assembly.

Referring now to the drawings, FIG. 1 illustrates the basic components of a new type of connector. Two axially aligned male members 10 each of which has an angled surface portion 11 are arranged in spaced relationship so that a circuit board 5 may pass therebetween. The circuit board 5 includes a hole that has an eyelet 1 mounted therein and a conducting path 3 that is in electrical circuit relationship with the eyelet 1. The eyelet 1 is made of electrically conducting material and is pressed or soldered into place. In this embodiment, the eyelet 1 has been riveted into place and, therefore, includes a lip at both ends. Alternately, a conduit without a lip could be pressure fitted or soldered into position. Further, a plated through-hole may also serve the purposes of this invention.

Figure 2:
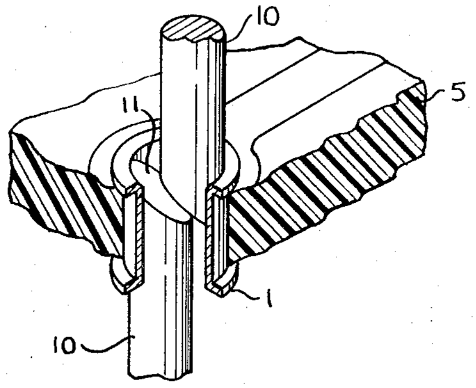
FIG. 2 is a partial cross-sectional diagram of the male and female contacts of a circuit board connector assembly in mated relationship.

FIG. 2 illustrates the mated relationship between the elongated members 10 and eyelet 1. An axial force applied to the elongated members 10 in the direction of the circuit board 5 forces the members 10 to contact each other at end surfaces 11. Since the angled surfaces 11 are in face-to-face relationship, they force the elongated members 10 out of alignment with each other and into the wall of the eyelet 1. Therefore, increasing the axial force on the elongated members increases the force on the inner wall of the eyelet 1 by the elongated members 10. Although the eyelet 1 and members 10 are shown having a round shape, any configuration may be used, so long as the contacts 10, when out of axial alignment, have a cross-sectional area larger than the eyelet so that the members 10 are forced into pressure contact with the inner wall of the eyelet 1.

FIG. 3 illustrates a preferred type connector which contains the novel male electrical contacts 10 that accomplish the objects of this invention. In this embodiment, there is an outer casing 8 which contains the inner housing 12, the male contacts 10, the roller bearings 14 and confining members 16. Confining members 16 extend through the outer casing 8 thereby supporting the housing 12 away from one wall of the inner casing 8 and permitting the housing 12 to slide back and forth within the casing 8.

The housing 12 includes an opening 13 for receiving a circuit board. Adjacent to and in line with the opening 13 is a blocking member 17 which is mounted on the wall of the housing 12. The blocking member 17 prevents a circuit board (not shown), which enters opening 13, from entering any further into the housing 12. The elongated male members 10 are connected together in a Y-shape wherein one end of the male members 15 is for receiving an electrical conductor to be placed in electrical circuit relationship with a predetermined terminal on a circuit board. The other end of the "Y," which comprises the two male contact members 10, is resilient so that the male contacts may move towards and away from each other unless held into position. The roller 14 and member 16 are confined to the space between the elongated members 10 and the inner walls of the housing 12.

When a circuit board is inserted into the opening 13 and forced against member 17, the entire housing 12 moves within the casing 8 in the direction of the arrow. As the housing 12 moves, the roller bearing 14 and member 16 which are located in a fixed position, force the male contacts 10 together. As the contacts 10 are forced together, they enter an eyelet in the circuit board (FIG. 4) and are forced against the inner walls of the eyelet. This action completes the electrical circuit relationship between the circuit board and an electrical conductor (not shown) attached to the male contacts at 19. The force of friction between the male contacts 10 and the eyelet located in the circuit board is generally sufficient to retain the circuit board in the housing and retain the elongated male members 10 in their mated relationship. An additional apparatus or modification to the existing housing 12 and casing 8 may be made to hold the elongated contacts 10 together once they are in mated relationship with a circuit board terminal.

FIG. 4 illustrates a cross-sectional view of the connector shown in FIG. 3 in mated relationship with a circuit board 5. This view illustrates how the housing 12 has been moved further into the casing 8 by the action of the circuit board 5 entering the opening 13 and pressing against member 17. The frictional force of the electrical contacts 10 into the wall of the eyelet 1, together with the force of roller bearing 14 against the arms of the male contact, holds the male contact in a locked position. The wiping action of the male contacts 10 against the inner wall of the eyelet 1 cleans the contact surfaces of oxides and helps to assure a low resistance drop between the two surfaces over the life of the connector. Generally, the force of the circuit board against member 17 is insufficient to lock together the male contacts 10 and the female eyelet contact 1; therefore, the connector assembly may be modified to include a detent or catch that will hold the housing 12 in the position into which it has been moved by the insertion of the circuit board 5 into the housing 12.

FIG. 5 illustrates a preferred embodiment of the electrical contact 6. A Y-shaped piece of metal having movable arms 9 and a base portion 15 comprises the male contact. The base portion 15 of the Y includes an opening 19 for receiving an electrical conductor. The other end of the base portion is hollowed out to give additional resilience to the arms 9. The ends of each arm 9 are bent towards each other so that each arm 9 includes an axially elongated portion 10 in axial alignment with the axially elongated portion of another arm. In this embodiment, elongated portion 10 terminates in an angled surface which makes an angle of about 30° from the end of the elongated portion 10. It is readily apparent that the application of a force against the arms 9 in the direction towards the other arm will result in the contacting of surfaces 11 against each other. The configuration of the contact 6 is such that the arms 9 and elongated end portion 10 are biased away from each other when the arms are forced towards each other so that when the force against the arms 9 is removed, the arms 9 and elongated end portions 10 will return to their original position.

FIG. 6 is an end view of the electrical contact shown in FIG. 5 to illustrate the relationship of the angled surfaces 11 of the end portion 10 of the contact 6. In this embodiment, the angled surfaces 11 are in generally face-to-face parallel relationship to facilitate the sliding action of surfaces 11 when one male member 10 is forced against the other.

FIG. 7 is an end view of an electrical contact 6 as shown in FIG. 5 where the angled surface is tapered or conically shaped. In this embodiment, the elongated members are in axial alignment but the end points 4 are not aligned to facilitate the sliding movement of the surfaces 11 upon contact.

While a preferred embodiment of the invention has been disclosed, it will be apparent to those skilled in the art that changes may be made to the invention as set forth in the appended claims, and, in some cases, certain features of the invention may be used to advantage without corresponding use of other features. For example, the shape of the end portion of the elongated members 10 may take any number of configurations that are conducive to the sliding action between the members 10 of a contact 6. Accordingly, it is intended that the illustrative and descriptive materials herein be used to illustrate the principles of the invention and not to limit the scope thereof.

Having described the invention, what is claimed is:

1. An electrical contact comprising:

a generally Y-shaped metal structure having a base portion and two resilient arms connected thereto, said resilient arms including an elongated end portion axially aligned with and projecting towards each other, said elongated end portions terminating in angled surface portions that oppose each other in generally face-to-face relationship so that when said angled surface portions contact each other said elongated portions are moved out of axial alignment.

2. The combination recited in claim 1 wherein said base portion of said metal structure includes means for receiving an electrical conductor.

* * * * *